(12) United States Patent
Gray

(10) Patent No.: US 8,959,965 B2
(45) Date of Patent: Feb. 24, 2015

(54) SECURITY DEVICE FOR A PEDAL VEHICLE

(71) Applicant: Derek Gray, London (GB)

(72) Inventor: Derek Gray, London (GB)

( * ) Notice: Subject to any disclaimer, the term of this patent is extended or adjusted under 35 U.S.C. 154(b) by 0 days.

(21) Appl. No.: 13/944,646

(22) Filed: Jul. 17, 2013

(65) Prior Publication Data

US 2013/0298615 A1 Nov. 14, 2013

Related U.S. Application Data

(63) Continuation of application No. 12/992,250, filed as application No. PCT/GB2009/001200 on May 13, 2009, now abandoned.

(30) Foreign Application Priority Data

May 14, 2008 (GB) .................................. 0808763.7

(51) Int. Cl.
*B62H 5/08* (2006.01)
*E05B 71/00* (2006.01)
*B62H 5/10* (2006.01)

(52) U.S. Cl.
CPC ........................................ *B62H 5/10* (2013.01)
USPC ......... 70/236; 70/14; 70/233; 70/234; 70/235

(58) Field of Classification Search
USPC ............................................. 70/14, 233–236
See application file for complete search history.

(56) References Cited

U.S. PATENT DOCUMENTS

| | | | |
|---|---|---|---|
| 511,430 A | 12/1893 | Hubert | |
| 512,868 A | 1/1894 | Cross et al. | |
| 561,070 A | 5/1896 | Anderson | |
| 577,673 A | 2/1897 | Wickliffe | |
| 583,905 A * | 6/1897 | Hillhouse et al. | 70/236 |
| 589,491 A * | 9/1897 | Baker | 70/236 |
| 589,861 A | 9/1897 | Schroeder | |
| 591,823 A * | 10/1897 | Dickinson et al. | 70/236 |
| 1,216,871 A * | 2/1917 | Snyder | 70/211 |
| 3,826,114 A * | 7/1974 | Emerson | 70/14 |
| 3,865,245 A * | 2/1975 | Lieb et al. | 211/5 |
| 3,865,246 A * | 2/1975 | Lieb et al. | 211/5 |
| 3,917,138 A | 11/1975 | Bergeron | |
| 3,926,018 A * | 12/1975 | Joersz | 70/19 |

(Continued)

FOREIGN PATENT DOCUMENTS

| | | | |
|---|---|---|---|
| BE | 337805 A | 12/1926 | |
| DE | 3804872 A1 | 8/1989 | |

(Continued)

OTHER PUBLICATIONS

International Search Report and Written Opinion issued in PCT/GB2009/001200, mailed Jul. 31, 2009, 9 pages.

*Primary Examiner* — Suzanne Barrett
*Assistant Examiner* — David E Sosnowski
(74) *Attorney, Agent, or Firm* — Alchemy-Partners, PC

(57) ABSTRACT

A security device can be secured to a pedal vehicle to prevent the vehicle being pedalled. The security device includes a receiving means and a securing means. The receiving means may include a through-hole means for receiving part of a frame and a pedal crank arm of the vehicle and may have an open configuration in which the frame part and a part of the crank can be placed in the through-hole means, and a closed configuration in which a frame part and crank arm are held in the through-hole means against relative movement therebetween.

14 Claims, 8 Drawing Sheets

(56) References Cited

U.S. PATENT DOCUMENTS

| | | | |
|---|---|---|---|
| 3,970,196 A | 7/1976 | Legge | |
| 4,216,665 A * | 8/1980 | McKelvey | 70/58 |
| 4,389,862 A * | 6/1983 | Hastings | 70/2 |
| 5,138,853 A * | 8/1992 | Chen | 70/209 |
| 5,284,036 A * | 2/1994 | Rosenbaum | 70/14 |
| 5,544,505 A * | 8/1996 | McIntosh et al. | 70/18 |
| 5,623,841 A * | 4/1997 | Deemar | 70/14 |
| 5,706,679 A * | 1/1998 | Zane et al. | 70/18 |
| 5,746,074 A * | 5/1998 | Collins | 70/18 |
| 5,887,461 A * | 3/1999 | Heffley | 70/18 |
| 6,018,968 A * | 2/2000 | Sides | 70/14 |
| 6,092,402 A | 7/2000 | Porcelli et al. | |
| 6,430,973 B1 * | 8/2002 | Huang | 70/18 |
| 6,701,757 B1 * | 3/2004 | Vito | 70/51 |
| 6,751,992 B1 | 6/2004 | Esquilin | |
| 6,829,914 B2 | 12/2004 | Bullock | |
| 6,862,906 B2 * | 3/2005 | Lindkjølen | 70/58 |
| 7,044,512 B1 * | 5/2006 | Moreno | 292/259 R |
| 7,124,607 B2 * | 10/2006 | Parsons et al. | 70/16 |
| 7,380,846 B1 | 6/2008 | Moreno | |
| 7,770,419 B2 * | 8/2010 | Stone | 70/2 |
| 8,056,945 B2 * | 11/2011 | Moreno | 292/321 |
| 2011/0113836 A1 | 5/2011 | Gray | |
| 2013/0298615 A1 * | 11/2013 | Gray | 70/236 |

FOREIGN PATENT DOCUMENTS

| | | |
|---|---|---|
| GB | 9023 A | 3/1896 |
| GB | 2283717 A | 5/1995 |
| JP | 2005281973 A | 10/2005 |
| WO | WO2009138743 A1 | 11/2009 |

* cited by examiner

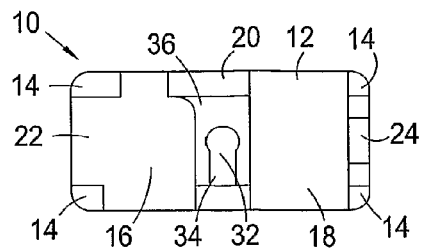 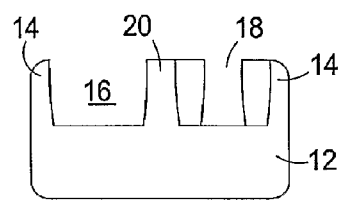 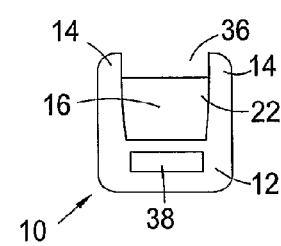
Fig. 4(a)　　　　Fig. 4(b)　　　　Fig. 4(c)
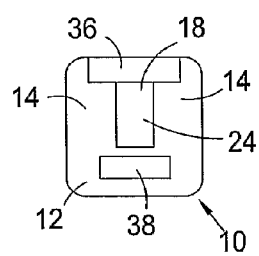 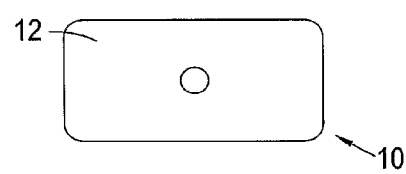
Fig.4(d)　　　　Fig.4(e)
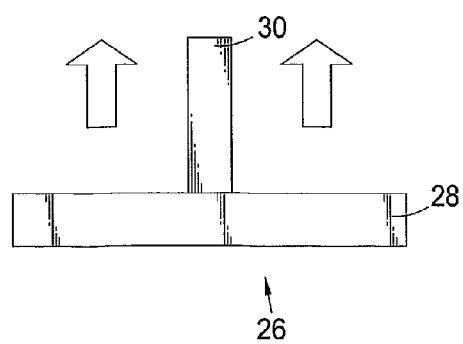 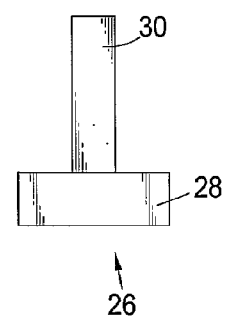
Fig.5(a)　　　　Fig.5(b)

SECURITY DEVICE FOR A PEDAL VEHICLE

CROSS-REFERENCE TO RELATED APPLICATIONS

The present application is a continuation of U.S. patent application Ser. No. 12/992,250, filed May 13, 2009, which is a national phase application of PCT application PCT/GB2009/001200 filed pursuant to 35 U.S.C. §371, on May 13, 2009, which claims priority to GB 0808763.7, filed May 14, 2008. All applications are incorporated herein by reference in their entirety and for all purposes.

TECHNICAL FIELD

This invention relates to a security device for attaching to a pedal vehicle to prevent the vehicle from being pedalled. The invention further relates to a security device, which can also prevent a pedal, or wheeled vehicle from being free-wheeled, or used in a conventional manner.

BACKGROUND

Security devices such as chains, padlocks and U-locks are commonly used to secure parts of a pedal vehicle to immovable objects such as railings or bicycle stands. By way of example, a padlock and chain combination would secure a pedal vehicle to a bicycle stand by feeding the chain through the frame and/or wheels of the vehicle, linking the chain to a bicycle stand and using the padlock to lock the ends of the chain together, thus locking the chain and securing the vehicle.

Unfortunately, known security devices such as padlocks, chains and U-locks are susceptible to being damaged or broken by a thief in an attempt to steal a bicycle secured by known security devices. It is possible for a thief, using suitably sized bolt cutters, to cut through the bar of a padlock, links of a chain or body of a U-lock. Alternatively, a relatively weak, or loose fitting chain or U-lock could be broken by a hammer, heavy device or crowbar. After a security device has been overcome it is then possible for a thief to pedal the vehicle away. One of the reasons for the inherent weakness of known security devices is that such devices have relatively thin, elongate, loose fitting parts that make them open to attack.

Known security devices are often large in size, being long and narrow in places, to enable them to be extended around a portion of the pedal vehicle and the object to which the vehicle is to be secured to. As a result, the security devices are difficult to carry because of their size and become awkward to fit in a secure position around the vehicle being secured. A further disadvantage of known security devices is that their dimensions and shape result in a loose fit between the pedal vehicle being secured and the security device thus creating a lot of space, or play, which might result in damage to the vehicle or provide a thief with further points of leverage, thus making it easier for the device to be broken.

Yet another disadvantage of known security devices is their fixed size, which restricts the number of pedal vehicles that it can be secured to. Therefore, known security devices are not, in general, interchangeable between different pedal vehicles and are typically configured to secure only a specific pedal vehicle model.

SUMMARY OF THE INVENTION

It is against this background that the present invention has been made. This invention results from efforts to overcome the problems of known security devices. Other aims of the invention will be apparent from the following description.

Generally, the invention resides in a security device for securing to a pedal vehicle to prevent the vehicle being pedalled, the device having: a pedal-space, configured to receive a portion of a pedal crank arm of a vehicle therein; a frame-space, configured to receive a portion of a frame of a vehicle therein; and securing means, movably connected to the device and configured to releasably secure a pedal crank arm in the pedal-space and a frame of the vehicle in the frame-space.

The ability of parts of the device to be movable with respect to one another enables the device to be fitted more securely to a pedal vehicle and, also, to be fitted to pedal vehicles of varying dimensions.

According to one aspect, the present invention resides in a security device for securing to a pedal vehicle to prevent the vehicle being pedalled, the device having: receiving means comprising: a structure having a through-hole means for receiving a part of a frame and a pedal crank arm of the vehicle, or another movable part of a pedal vehicle, therethrough; and a link-structure configured to link parts of the structure having the through-hole means, wherein the device comprises parts that are linearly movable and the receiving means has an open configuration in which the frame part and a part of said crank can be placed in said through-hole means, and a closed configuration in which a frame part and crank arm are held in the through-hole means against relative movement therebetween; and securing means for releasably securing the receiving means in the closed configuration.

The through-hole means, defined by the structure, is preferably delimited by the link-structure for receiving parts of the vehicle therein. In effect, the link-structure preferably functions to partition the through-hole means, and enables the portions of a vehicle to be held individually and, therefore, more securely.

Moreover, the ability of parts of the device to be moved, or adjusted, permits easier insertion and removal of parts of a vehicle from the device. The parts may be linearly movable because the device may be required to be securably attached to a portion of a vehicle where space is restricted. Linear movement enables the parts of the device to be moved such that the receiving means is movable in a more confined space and suitably adjusted before being secured in the closed configuration. In use, linear movement may be more ergonomic than arcuate movement about an axis. The through-hole means may comprise a first through-hole for receiving frame part, and second through-hole for receiving a crank arm of the pedal vehicle.

A further aspect may provide a security device for a pedal vehicle, wherein the device comprises receiving means, comprising through-hole means for receiving a part of a frame and a pedal crank arm of the vehicle therethrough, the receiving means having an open configuration in which the frame part and a part of said crank can be placed in said through-hole means, and a closed configuration in which a frame part and crank arm are held in the through-hole means against relative movement therebetween and locking means for locking the receiving means in the closed configuration.

The through-hole means may include a first opening and a second opening on opposing sides of the receiving means. The through-hole means may further comprise a third opening on an adjacent side of the receiving means to the first opening. A bearing casing of a pedal connected to the pedal crank arm may be held in the receiving means via the third opening.

The first and third openings may be arranged with their axes at substantially 90° to one another. Alternatively, the or each opening may be off-set, or asymmetrical, from the other openings or body of the device such that the device may be secured to an irregular shaped vehicle.

The receiving means may comprise a dividing part separating the first and second through-holes. The dividing part may be a part of the frame of the device or may be an adjustable and/or interchangeable component and may be formed by the link-structure. Advantageously, the dividing part may reduce manufacturing costs and improve the adaptability of the device for different applications.

The receiving means may comprise a securing means, which may be in the form of a closure or bar, and which may depend from the dividing part. The securing means may be movable between a first position in which the receiving means is in the closed configuration and a second position in which the receiving means is in the open configuration. The locking means may be configured to secure the closure against movement. The locking means may comprise a key operated lock.

The bar may be a separable component of the device or may be movable and implemented by an extension of one or more limbs. The bar may function as a link structure.

The device may further have a partially open position in which one of the frame part and crank arm can be placed in the through-hole means while the other is retained therebetween.

The device may further include an extending member, which can be positioned in an extended position in which, when the device is mounted on a pedal vehicle, the extending member extends through a wheel of the vehicle. The extending member may also be positionable in a retracted position in which, when the device is mounted on a pedal vehicle, the extending member does not extend through the wheel of the vehicle.

The parts of the device may be linearly movable in a direction substantially parallel to the link-structure. The link-structure preferably defines an axis extending between parts which are linked by the link structure, and the parts of the device are preferably linearly movable with respect to this axis.

By further restricting movement of the parts in this manner, the attachment of the device to a vehicle may be improved by (i) enabling the position of the through-hole means to be adjusted prior to be securably held in the closed configuration and/or (ii) enabling the portions of the vehicle to be positioned into the through-hole means and to be located therein as the device is manoeuvred into the closed configuration. Therefore, the distance between the openings in the closed configuration may be adjusted and the device may be fitted to different pedal vehicles or different parts of the same pedal vehicle.

The through-hole means suitably comprises at least one part defining at least one opening, and preferably at least two parts which together define at least one opening, and preferably defining together at least two openings. The through-hole means may comprise a first opening for receiving a portion of a pedal crank arm of a vehicle therein and a second opening for receiving a portion of a frame of a vehicle therein.

The receiving means of the device may have a body and the pedal-space and the frame-space may be defined and partially enclosed by the body and limbs extending from the body. In effect, the body and the limbs extending from the body form a framework into which a pedal crank arm and portion of a frame can be located before the securing means seals the device closed. The arrangement of the body and the limbs is such that the device can securely fit around the vehicle and minimise movement of the device and relative movement of two parts of the vehicle, such as pedal crank arm and frame, when the device is in the closed/secured position.

Delimitation of the pedal-space and the frame-space may improve the fit of the device to a pedal vehicle that is to be secured. The securing means, which may alternatively be detachable from the device, is movable between an open and closed position such that the device can be placed on to, and removed from, a pedal vehicle. In the closed position the securing means can be locked in place. The securing means may be lockable using a key or similar locking means.

The link-structure may comprise one or more link-structure parts. Where there is more than one link-structure part, the link-structure parts may be releasable fixable to one another. The link-structure preferably links the parts of the structure so that parts of the structure are fixed with respect to one another when the device is in the closed configuration.

If the link-structure comprises two or more parts then the parts may be held together in the closed configuration or may securably enclose a part of a pedal vehicle therebetween, such as the spokes.

The parts of the structure linked by the link-structure may comprise any parts of the receiving means. Preferably, the link-structure links at least two parts of the receiving means. Preferably, the link-structure links parts of the through-hole means. Preferably, the link-structure links the at least two parts of the through-hole defining means.

The link-structure may comprise at least one part which is integrally formed with at least one part of the through-hole means.

The parts of the device that are linearly movable with respect to one another may comprise any parts of the receiving means. The parts of the device that are linearly movable with respect to one another may comprise parts of the link structure. The parts of the device that are linearly movable with respect to one another may comprise parts of the through-hole means.

The parts of the device that are linearly movable with respect to one another are preferably the parts that are linked by the link structure. Delimitation of the spaces of the through-hole means may be implemented by the link-structure that links parts of the structure.

The receiving means may be defined by a body and the through-hole means is defined by limbs extending from the body. The through-hole means may comprise a first opening and a second opening configured on opposing sides of the receiving means, thus allowing the through-hole means to be securely held with respect to a common feature, preferably the link-structure. The device may further comprise a third opening on an adjacent side of the receiving means to the first opening. The third opening permits another part of the vehicle to be secured within the device and, preferably, enables a pedal axle to be secured therein. The receiving means may comprise a dividing part separating the first and second through-holes. The through-hole means may comprise: a pedal-space, configured to receive a portion of a pedal crank arm of a vehicle therein; and a frame-space, configured to receive a portion of a frame of a vehicle therein; and the securing means are movably connected to the device and configured to releasably secure a pedal crank arm in the pedal-space and a frame of the vehicle in the frame-space.

The pedal-space may be configured to receive the pedal axle of a pedal crank arm when the pedal crank arm is received in the pedal-space. The pedal-space, the frame-space and an axle-space may be defined by at least four limbs extending from the body, the limbs including: a first limb and a second limb, arranged to define the pedal-space and the frame-space; a common-limb, arranged between the first limb and the second limb to form a barrier between the pedal-space and the frame-space; and an axle-limb, arranged to define the axle space and configured to receive a portion of a pedal axle extending from a pedal crank arm such that the pedal axle, pedal crank arm and the frame of the vehicle can be releasably secured within the device.

In a particular embodiment, the device may further comprise an axle-space, configured to receive the pedal axle of a pedal crank arm when the pedal crank arm is received in the pedal-space. By accommodating the pedal axle the device is fixed thereabout and movement of the device in the closed position is prevented and any rotation of the pedal relative to the rest of the vehicle to which it is attached is substantially eliminated.

In another particular embodiment, wherein the vehicle is accommodated with the device, the device may comprise a body and the pedal-space, the frame-space and the axle-space may be defined by at least four limbs extending from the body, the limbs including: a first limb and a second limb, arranged to define the pedal-space and the frame-space; a common-limb, arranged between the first limb and the second limb to form a barrier between the pedal-space and the frame-space; and an axle-limb, arranged to define an axle-space, configured to receive a portion of a pedal axle extending from a pedal crank arm such that the pedal axle, pedal crank arm and the frame of the vehicle can be releasably secured within device.

The aforementioned limbs, extending from the body, function to provide a housing in which the pedal crank arm and a portion of the frame can be placed and secured within with the securing device. Any number of limbs may be used to provide this function. Alternatively, a body may not be required and the limbs which form a frame around the vehicle may be connected to other limbs and, in effect, form a web of limbs which define at least one of the pedal-space, frame-space, axle-space and attachment-space.

The device may comprise a body and the pedal-space and the frame-space are defined by three limbs extending from the body.

The limbs may extend generally perpendicularly away from the body and generally mutually parallel to one another.

One of the limbs may be a common limb arranged to divide the pedal-space and the frame-space. A portion of the pedal-space may be open to the frame-space. The pedal-space and frame-space may be connected or, alternatively, may be separated from one another. Minimising the material used can reduce the cost and weight of the device. To minimise the material used, all or part of the securing means may be used to divide, at least in part, the pedal-space from the frame-space.

The securing means may be movably connected to a limb.

The securing means may be movably connected to a limb or the securing means may be movably connected to a limb that is positioned between the pedal-space and the frame-space. The securing means may be rotatably connected to the device about an axis that is substantially perpendicular to the plane defined by the body.

The securing means may be connected to any of the limbs or part of the body. The securing means may be hingably connected to the device to form a hasp. Alternatively, the securing means may be slidably received on, or within, the device to form a clasp.

The securing means may be movably connected to a limb that is positioned between the pedal-space and the frame-space.

The device may have a body and may further comprise an attachment-space that is defined by limbs extending from the body, the attachment-space being configured to receive a portion of a secondary security device therein, and the securing means being configured to releasably secure the secondary security device.

The attachment space is configured such that a security rope, or similar secure structure or feature can be located into the device and secured therein. By way of example, if a security rope were used as a secondary security device then a Turks-head knot, for example, located at the end of the security device could be lockably received in the attachment space.

The securing means may be rotatably connected to the device about an axis that is substantially perpendicular to the plane defined by the body.

The device may have a body and further comprise an attachment-space that is defined by limbs extending from the body, the attachment-space being configured to receive a portion of a secondary security device therein, and the securing means being configured to releasably secure the secondary security device.

The securing means may be a bar, and the bar is connected to the device by a pin, the pin being configured to extend, substantially perpendicularly to the bar and the body, from the bar and into an aperture in a limb, such that the bar is rotatable about an axis defined by the pin and movable with respect to the pin.

The portion of the frame may be a chain stay and device further comprises a protrusion configured to extend from the device and between the spokes of a wheel of a vehicle when the pedal crank arm and chain stay of a pedal vehicle are located in the device, such that a wheel can be prevented from freewheeling.

The protrusion may be slidably received in a body of the device.

The receiving means may comprise a securing means in the form of a closure or bar depending from the link-structure and being configured to be movable between the open configuration and the closed configuration.

In an embodiment wherein the securing means may be a bar, and the bar may be connected to the device by a pin, the pin is configured to extend, substantially perpendicularly from the bar and the body, from the bar and into an aperture in a limb, such that the bar is rotatable about an axis defined by the pin and movable with respect to the pin. Alternatively, the bar may be hingeably connected to the device via a hinge.

The device may further include an extending member, which can be positioned in an extended position in which, when the device is mounted on a pedal vehicle, the extending member extends through a wheel of the vehicle.

The security device may be adapted to receive a portion of a chain stay and device may further comprise a protrusion, or extending member, configured to extend from the device and between the spokes of a wheel of a vehicle when the pedal crank arm and chain stay of a pedal vehicle are located in the device, such that a wheel can be prevented from freewheeling.

The protrusion may be slidably received in a body, or limb, of the device. The protrusion may be hingeably attached to the body or the limb of the device.

The security device may comprise locking means to releasably secure the device in a closed position such that a pedal crank arm and a frame are locked within device. The locking means may comprise a key-lock device, combination lock or the like. The locking means may be integrated within a body, limb or securing means of the device.

The structure may comprise a first bracket part. The bracket part preferably comprises at least a first bracket component and a second bracket component extending at an angle from the first bracket component.

A first opening of the through-hole means may be defined by the first bracket part and a second opening of the through-hole means is defined by a second bracket part.

The link-structure may be defined by the or each bracket and arranged to substantially close the or each opening in the closed position. The or each bracket may define a web, or web of limbs.

The first and second brackets cooperate and may be permanently connected together or may be connectably detachable at one or more points thereon. The brackets may be connected at one end using a tongue-and-grove, or pin-and-hole, and connected at the other end by the securing means.

The or each bracket may be configured to form at least one recess defining the or each opening and has at least one protrusion extending therefrom. The protrusion may be a permanent fixture of the device or may be slidable with respect to the structure. There may be a first protrusion extending from the recess and a second protrusion arranged to slidably extend from the device.

The or each bracket may comprise a first protrusion and a second protrusion. A third protrusion may be provided to extend from the device and inhibit, in use, the turning of the wheel of a vehicle secured by the device. The link-structure may be defined by the or each protrusion. The brackets may be connected in the closed configuration.

The first protrusion may be configured on the first bracket and the second protrusion is mounted on the second bracket and the device is configured such that, in the closed configuration, the first protrusion substantially closes the second opening and the second protrusion substantially closes the first opening.

The first protrusion is configured to extend from a protrusion-side of the first opening and the second protrusion is configured to extend from a protrusion-side of the second opening, and the first protrusion connects with a closure-side of the second opening and the second protrusion connects with a closure side of the first opening.

The or each protrusion may be movably engageable with the or each closure-side of the respective opening. The link-structure may be defined by the first bracket part and the second bracket part is slidably mounted upon the link-structure.

The first bracket part may substantially close the second opening of the second bracket part in the closed position, and wherein an object secured in the first opening is securably held therein by the first bracket part being releasably secured to the second bracket.

The first bracket part may be configured such that the first opening is connectable with a saddle of a vehicle and the second bracket part is connectable with a portion of a seat-tube of the vehicle.

The receiving means may comprise parts that are movable with respect to one another such that the position of the first opening with respect to the second opening, in the closed configuration, can be adjusted.

The structure may be configured with holes, which enable parts of the structure to be securably closed in two or more predetermined positions. The second bracket may be engageable with the first protrusion at at least two points, or holes, thereon.

An axis defined by the structure having the through-hole means may be substantially perpendicular to the link-structure.

The securing means may be suitable for releasably securing the receiving means in the closed configuration or may be movably connected to the device and configured to releasably secure a pedal crank arm in the pedal-space and a frame of the vehicle in the frame-space.

The device may comprise and/or be fitted with accessories such as lights or reflectors to improve visibility. The device may have an attachment, such as a magnetic attachment, to allow the device to be attached or secured to the frame when not in use.

The device may be configured to function as an integrated safety lamp, with, for example, either a white or red lens, so that when not securing the vehicle it can be used as a safety lamp when suitably attached to a vehicle.

BRIEF DESCRIPTION OF THE FIGURES

In order that the invention may be more readily understood, reference will now be made, by way of example, to the drawings in which:

FIGS. 4(a) to (e) show a component of a security device of an embodiment of the invention in different orthogonal views;

FIGS. 5(a) and (b) show elevation views of another component of a security device of an embodiment of the invention;

DETAILED DESCRIPTION

Figure 1:
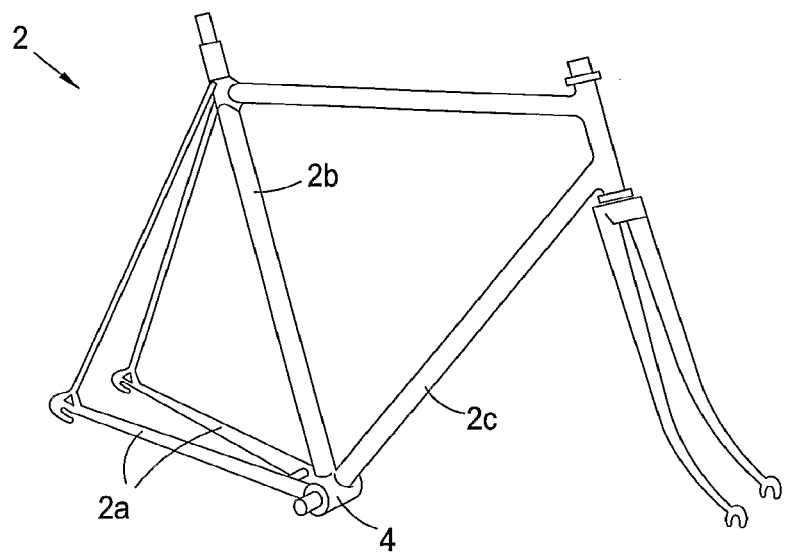
FIG. 1 is a view of a pedal vehicle frame.
Figure 2:
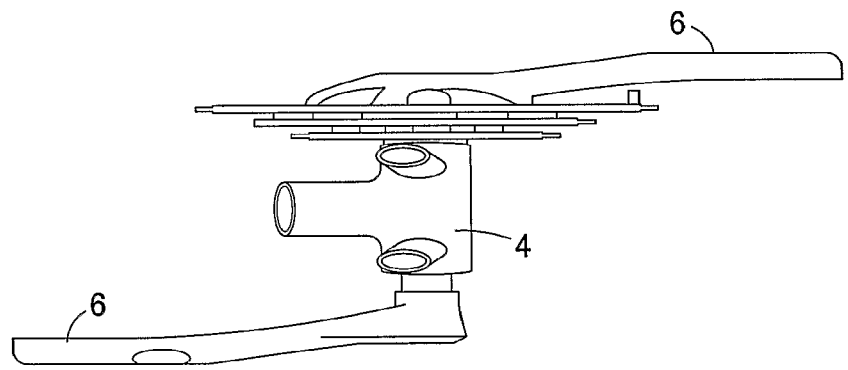
FIG. 2 is a view of a pedal crank arm, having a gear, which is located on a portion of a known pedal vehicle frame in the region of a bottom bracket shell.
Figure 3:
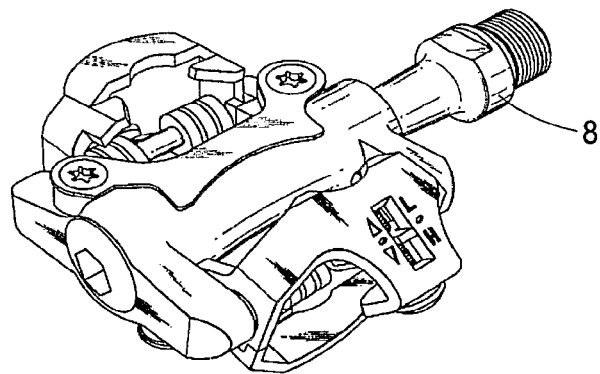
FIG. 3 is a perspective view of a pedal having a pedal axle extending therefrom.

Referring to FIGS. 1 to 3 of the drawings, a pedal vehicle frame 2 is shown comprising chain stays 2a, a seat tube 2b and a down tube 2c. FIG. 2 shows a bottom bracket shell 4 of the frame 2 with a pedal crank arm 6 located on either side of the bottom bracket shell. FIG. 3 is a perspective view of a conventional pedal having a pedal axle 8 extending therefrom, the screw thread portion of the pedal axle configured to be attachably received in a distal end of a pedal crank arm by screwing the pedal onto a crank arm.

In light of the teaching of the present invention it will be clear and unambiguous to the skilled person that there are a number of components and integers common to the embodiments described below. In particular, each security device has a structure, or body, having through-hole means. The through-hole means, formed by the structure, define the openings or spaces in which parts of a pedal vehicle can be releasably secured.

A linked structure, which may take the form of a limb, connecting bar or protrusion, functions to link parts of the structure. The link-structure, in effect, separates the through-hole means. Each of the security devices according to the present invention has parts that are linearly moveable between an open and a closed configuration.

Securing means, forming part of each of the disclosed security devices, function to releasably secure the receiving means in the closed configuration.

A device 10 for securing to a pedal vehicle to prevent the vehicle being pedalled according to an embodiment of the invention, and shown generally in FIGS. 4 to 8, comprises receiving means 12, 14, 20, 26 comprising through-hole means 16, 18, 22 for receiving a part of a frame and a pedal crank arm of the vehicle therethrough, the receiving means being moveable between an open configuration in which the frame part and a part of said crank can be placed in said through-hole means, and a closed configuration in which a frame part and crank arm are held in the through-hole means against relative movement therebetween; and locking means for locking the receiving means in the closed configuration.

More specifically, there is shown a pedal-space 16, configured to receive a portion of a pedal crank arm 6 of a vehicle therein; a frame-space 18, configured to receive a portion of a frame of a vehicle therein; and securing means 26, movably connected to the device 10 and configured to releasably secure a pedal crank arm in the pedal-space 16 and a frame of the vehicle in the frame-space 18.

Referring now to FIG. 4a, a component of a security device 10 is shown in plan view comprising: a body 12 which, in plan view, has a substantially rectangular profile, four limbs 14 arranged at each corner of the body 12 and extending therefrom generally parallel to one another and generally perpendicularly away from the body 12, a pedal-space 16 formed between two of the limbs 14 on one longitudinal side of the body, a frame-space 18 formed between two limbs, on the opposite longitudinal side of the body from the pedal-space; and a common-limb 20 located between and further defining the pedal-space 16 and the frame-space 18. The device 10 further comprises an axle-space 22 and an attachment-space 24 arranged at the longitudinal ends of the device 10. FIG. 4c is an end elevation view of the device of FIG. 4a, looking into the common limb 20 through the axle-space 22. FIG. 4d is an end elevation view of the opposite side of the device from the view shown in FIG. 4c, wherein the common-limb 20 is viewed through the attachment-space 24. In an alternative embodiment, the common-limb is omitted. In further alternative embodiments, the axle-space and/or the attachment-space are omitted.

As described above, the pedal-space 16 and the frame-space 18 are defined by limbs 14, which extend away generally perpendicularly from the generally planar main body 12 of the device. In the embodiment shown in FIG. 4a, five limbs are provided. The common-limb 20 is arranged in the centre of the device 10 and divides the pedal-space 16 from the frame-space 18. The remaining four limbs 14 are located at each corner of the substantially planar body 12. The limbs located on the longitudinal ends of the device 10 define the axle-space 22 and the attachment-space 24.

FIG. 5 shows a securing means 26 of the security device having a bar 28 and a pin 30 extending therefrom. FIG. 5a shows an end elevation view while FIG. 5b shows a side elevation view, of the securing means 26. The pin is arranged to extend substantially perpendicularly from the bar and function as an anchor, holding the bar in place when the device is in a locked configuration. In the embodiment shown, the pin 30 is attached to the bar 28 but may, alternatively, be detachable therefrom.

A recess 32 is provided in the common limb 20 of the device and is adapted to receive a locking means which is in the form of a locking mechanism or device (not shown) which locks the pin 30 of the securing means 26 in place against relative movement at least in a longitudinal direction of the pin, when the bar 28 is in a closed position. Alternatively, the locking mechanism may be located on the bar 28 itself or within the body 12 of the device 10. Preferably, the locking device is integrated within the security device 10 such that it is easily accessible to a user, enabling access to the lock, without the elements of a vehicle obstructing access.

The bar 28 is connected to the device via the pin 30, which is inserted through an aperture 34, located on the common limb 20 and anchored therein. The pin may be attached, by way of example, using a screw thread fit or a bayonet fit. Via the pin, the bar may be movably connected to the device or separable from the device as shown in the Figures.

When the bar is in a locked position, the pin is fully inserted into the aperture in the common limb and the bar is located in a rebate 36 on the common limb 20 and/or limbs 14, or spaced between the limbs, such that the external surfaces of the bar do not extend beyond a perimeter defined by the body 12 and the limbs 14, 20 of the device 10 when in a locked position. The bar is therefore held against rotation, relative to the body 12, by the distal ends of the limbs 14, which extend away from the body 12 beyond the rebates 36. In other words, the dimensions of the body and the limbs define a cuboid volume and when the bar is in the locked position it does not extend beyond said cuboid volume. In an unlocked position, the pin is configured to slide at least partially out of the common limb to enable the bar to move out of the rebate 36 and rotate about the pin. The pin may be resiliently biased towards the closed position by using, for example, a spring to pull the pin into the recess.

In an alternative embodiment, the bar may be hingeably connected to the device at a hinge. When hingeably closed, the bar may rest within the rebate.

Figure 6:
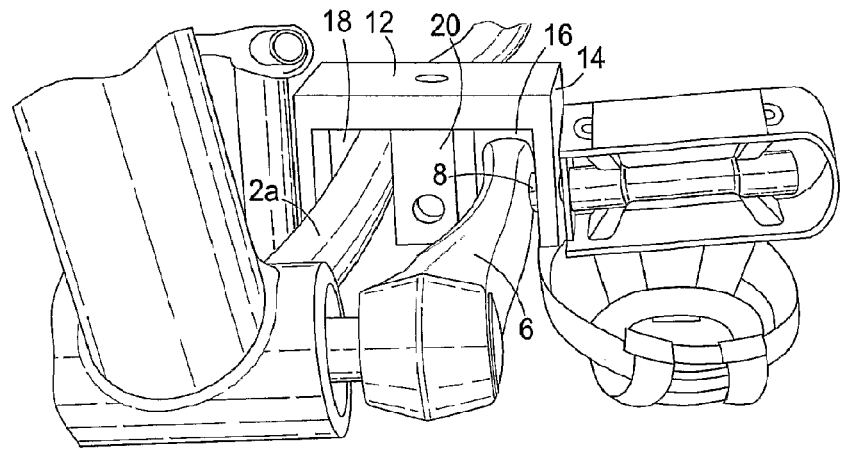
FIG. 6 shows an embodiment of the security device component shown in FIG. 4 arranged upon a pedal vehicle to receive the vehicle chain stay and crank arm.

FIG. 6 shows the device located on a pedal vehicle. The body 12 of the device with the limbs 14, 20 extending therefrom are configured to receive a chain stay 2a, crank arm 6 and pedal axle 8 of the vehicle. The chain stay 2a extends through the frame-space 18 of the device on one side of the common limb 20 and the crank arm 6 extends into the pedal-space 16 on the opposite side of the common limb, while the pedal axle 8 extends substantially perpendicularly from the crank arm through the axle space 22.

The device is preferably located on the opposite side of a vehicle frame from the pedal gear-cogs, which is normally the left-hand side of the vehicle with respect to the direction of travel. The device may, however, be located on either side, and in any orientation, on the vehicle.

Figure 7A:
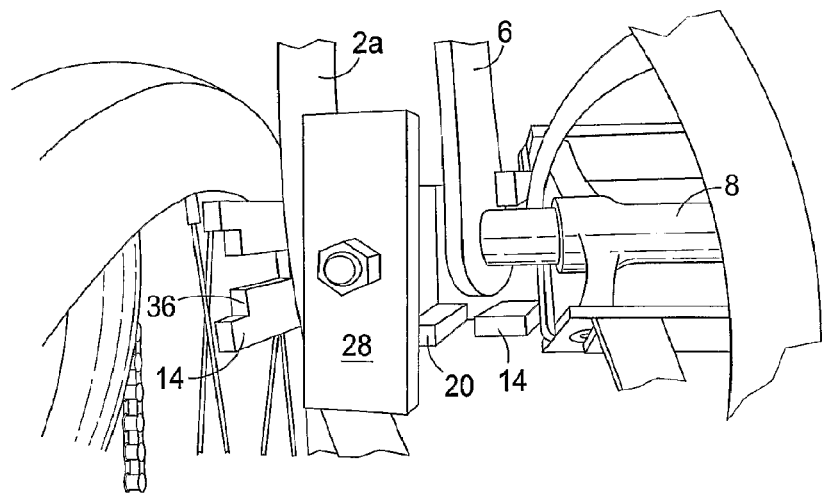
FIGS. 7(a) to (c) shows a bottom view of the security device of FIG. 4 located on a pedal vehicle as shown in FIG. 6, wherein the component of FIG. 5 is shown connected to the device in an open, intermediate and closed position.

FIG. 7*a* is a perspective view from beneath the device as shown in FIG. 6, showing the chain stay 2*a*, the crank arm 6 and the pedal axle 8 located in the respective spaces of the device. The common limb 20 between the pedal-space and the frame-space is arranged to provide a secure fit thus limiting the movement of the device with respect to the chain stay 2*a* and crank arm 6. In FIG. 7*a*, the bar 28 of the securing means is shown in an open position wherein the chain stay and the crank arm can be inserted into and removed from the device. In use, a user would align a pedal crank arm 6 until it was parallel to a chain stay 2*a* and the device would be placed onto the aligned chain stay and pedal crank arm. The pedal-space 16 of the device 10 may also engage the pedal axle bearing through the axle-space 22, which retains the security device against movement relative to the pedal, and, therefore, the frame of the vehicle.

Figure 7B:
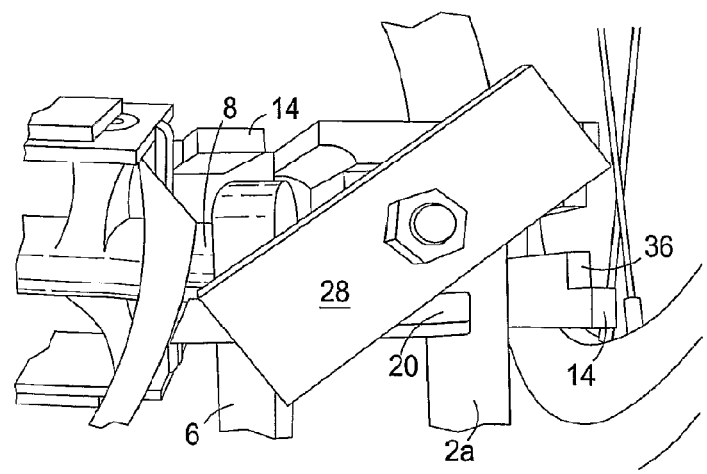
Figure 7C:
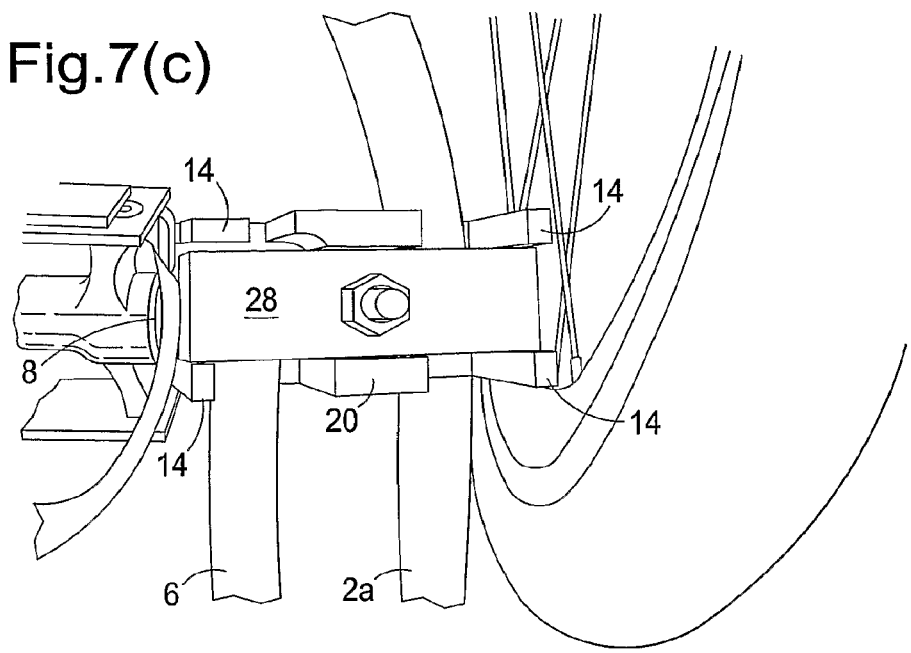

Thereafter, as shown in FIG. 7*b*, a user would rotate the bar 28 of the securing means into an intermediate position, wherein the bar is rotated part-way towards a closed position. In a closed position, the bar is arranged to move into the rebate 36 of the device in order that the chain stay and crank arm are secured therein. FIG. 7*c* shows the bar in the closed position with the bar located in the rebate 36 and locked in position to prevent the crank arm 6 being moved with respect of the chain stay 2*a*, thus preventing the vehicle from being pedalled.

To facilitate the operation of securing the bar within the rebate the bar is pulled towards the main body of the device. In effect, the bar will be gently biased against the device in the open and intermediate positions of FIGS. 7*a* and 7*b* until the bar rotates into the closed position of FIG. 7*c*, wherein the bar is movably biased into the rebate.

The lock of the device, not shown in FIG. 7, may be a conventional key-operated lock or may be a combination lock. The lock may be integrated with the body of the device, within the common limb or within the bar. The lock functions to secure the bar within the rebate of the device to lockably secure the pedal crank arm and the chain stay of the vehicle within the device.

Figure 8:
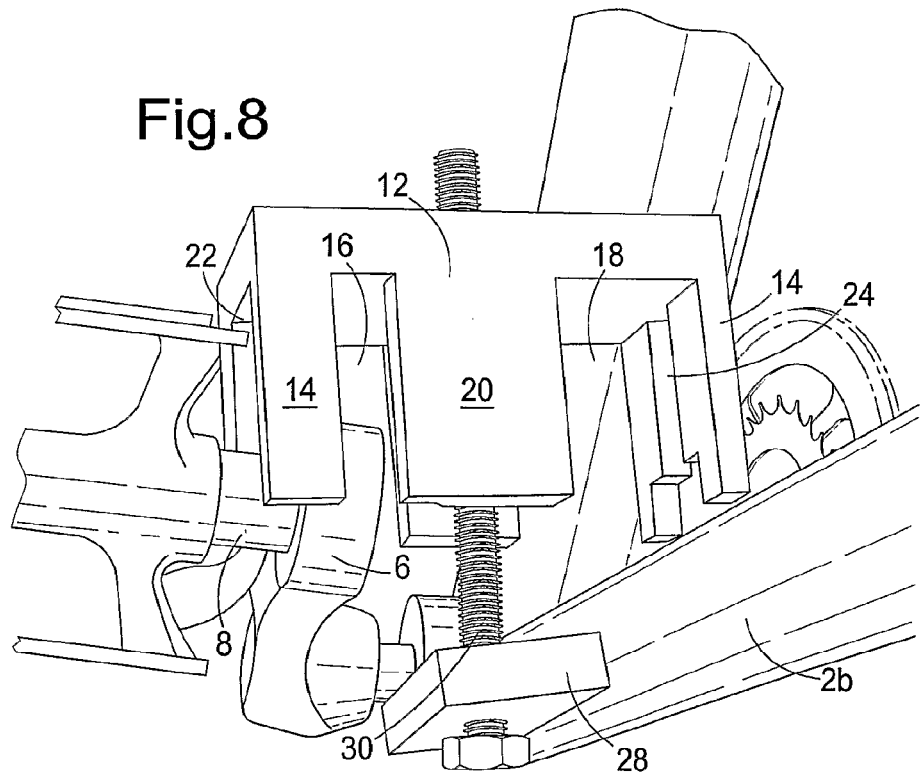
FIG. 8 shows the security device components of FIGS. 4 and 5 adjacent an alternative pedal vehicle frame mounting position.

FIG. 8 shows the device in an alternative position, wherein the crank arm 6 is being received within the pedal-space 16 and the frame-space 18 is being positioned to receive a portion of the seat tube 2*b* of the pedal vehicle frame. In this position, the bar 28 can be moved from the open position, as shown, and into a locked position with the crank arm and the seat tube secured therein such that the vehicle is prevented from being pedalled. The device is attached and secured in the same manner as described above for the chain stay. Alternatively, the frame-space 18 may be configured to receive any part of a pedal vehicle frame in a similar manner to the embodiment shown in FIGS. 7 and 8, to prevent the vehicle from being pedalled.

In an alternative embodiment of the security device, the device may further comprise a protrusion 38 that extends from the device. When a device is fitted on a pedal vehicle to secure a pedal crank arm and a chain stay therein, the protrusion 38 extends from the device and through the rim of a wheel between the spokes such that the wheel is prevented from rotating or freewheeling. The protrusion 38 may be a permanent fixture with respect to the body 12 of the device or may be slidably received within the body to extend from, and be retracted into, the body. The protrusion 38 is shown, by way of example, integrated within the body in a retracted position as shown in FIGS. 4*c* and 4*d*.

The movement of the protrusion may be mechanically controlled by the lock or the securing means and may be releasably securable in any position.

Many variations are possible within the inventive concept. For example, the pedal-space and the frame-space do not have to be fully enclosed. The common limb 20 may be adapted to result in the pedal-space 16 and the frame-space 18 being partially open to each other to reduce the amount of materials required in the device thus reducing weight and cost.

As an alternative, the common limb 20 may be omitted and the pin 30 of the securing means, extending from the bar 28, may be suitably adapted to divide the pedal-space 16 from the frame-space 18 and provide a secure fit between the device and pedal vehicle.

The pedal-space 16 and the frame-space 18 do not need to be fully separated and alternative means, such as an insert, may be used to divide the spaces and provide a secure or tight fit between the security device and the crank arm or portion of the frame located therein. The insert, or liner, may be provided with the device and may be made of a suitable material such as rubber to prevent the device from contacting the frame, which might lead to damage occurring. The device itself may be made of a rubber material having a suitable Shore hardness and cutting resistance, but preferably has metal parts for maximum strength.

The bar 28 of the securing means may take any form which can be configured to releasably secure a pedal crank arm 6 and part of a frame of the vehicle within the device. The securing means may comprise more than one bar and the or each bar may be secured to the common limb 20, limbs 14 located at the corners of the body 12 or to the body 12 of the device itself. Any such combination, or number of limbs, bodies and bars, or their structural equivalents may be used to define a security device having a receiving means, through-hole means, pedal-space, frame-space and locking means or securing means, the locking or securing means movably connected, or connectable, to the device and configured to releasably secure a pedal crank arm and frame of a vehicle therein.

In an alternative embodiment, the securing means, or bar, may take the form of the corresponding device having a pedal-space and a frame-space. In such an embodiment, the bar has limbs that align with the limbs on the device to form, in part, the pedal-space and the frame-space. By way of example, the bar is a mirror image of the device and when in a closed position, connects or interfaces with the device and forms a closure.

The aforementioned features of the device may be embodied in other configurations and, in light of the teaching of the present invention, features may be interchangeable between the example embodiments described and shown herein.

FIGS. 9(*a*) and 9(*b*) show a security device 10 having a receiving means 12 comprising limbs 14, 20 and through-hole means 16, 18, 22 defining a first opening 16 and a second opening 18. In particular, the receiving means has a link-structure 20 in the form of two limbs 20, which functions to link parts of the structure 12 that define the through-hole means. It can be seen that the link-structure separates, or partitions, the first and second openings 16,18. The link-structure functions as a common limb.

More specifically, the structure 12 has a first bracket part 102 and a second bracket part 104. Each bracket part has an arcuate shaped limb 14 that defines part of the structure that is linked together. The arcuate limbs 14 define, in part, the through-hole means 16, 18.

On one side of the arcuate limb 14 of the first bracket part 102 is a closure-side 106 while on the other side of the arcuate limb is a protrusion-side 108.

In this particular configuration, the first and second openings are on opposite sides of the structure of the receiving means. The limbs 14 are linked by the link-structure 20. The link-structure comprises a first protrusion 110 of the first bracket part 102 and a second protrusion 112 of the second bracket part 104.

The first and second protrusions 110, 112 extend from the protrusion sides 108 of the respective arcuate limbs 14 of the respective bracket parts 102, 104. Preferably, the protrusions extend approximately normally from the arcuate form of the arcuate limbs 14 of the structure 12.

Overall, the structure 12 of the receiving means of the security device 10 is defined by an assembly having the first bracket part 102 and the second bracket part 104. In an assembled condition, or closed configuration, the closure side 106 of the first bracket part 102 connects with the second protrusion 112 that extends from the protrusion side 108 of the second bracket part 104. Similarly, the closure side 106 of the second bracket part connects to the first protrusion 110 extending from the protrusion side 108 of the first bracket part 102.

Figure 9A:
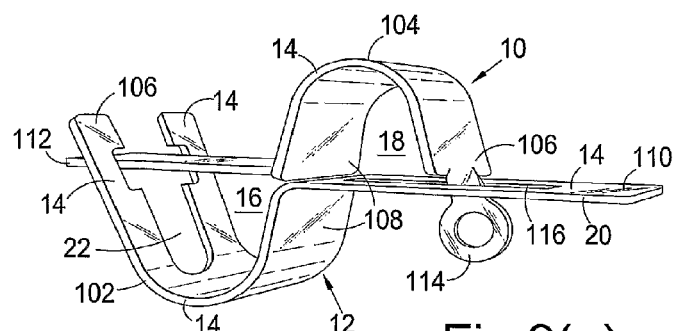
FIGS. 9(a) and 9(b) show perspective views of another embodiment of the present invention in a closed configuration.

In the embodiment shown in FIG. 9a, the second bracket part 104 has an eye 114 that extends through a slot 116 that forms part of the first protrusion 110. In the closed configuration, the securing means, or a padlock (not shown) functions to lock the first and second bracket parts together such that the through-hole means and the respective first opening, second opening and third opening 16, 18, 22 are held against relative movement therebetween.

Securing means (not shown) may be provided in the region of the closure side 106 of the second bracket part 104 and are configured to secure said closure side 106 to the first protrusion 110.

The securing means may take the form of a padlock-type device and releasably engage with the eye 114 and prevent the eye from passing through the slot 116.

Preferably, the securing means are connected to, or incorporated on, the portion of the arcuate limb 14 of the second bracket part 104. To be clear, the securing means is positioned upon the second bracket part to be adjacent the first protrusion 110 in the closed configuration.

The securing means is configured to releasably secure the first protrusion 110. By way of example, key-operation of the securing means is arranged to slide a bolt, or securing bar, from a body of the securing means from an open position, in which the first protrusion 110 can be separated from the closure side 106 of the second bracket part 104, to a closed position in which the bolt slides around the first protrusion 110 partially enclosing it therein.

The closure side 106 of the first bracket part 102 connects, similarly, to the second protrusion 112 of the second bracket part 104 by receiving said second protrusion 112 through a channel 118. Alternatively, the function of the channel 118 may be implemented by one or more holes, or even a slot.

In the configuration shown in FIG. 9a, the alignment of the protrusion sides 108 of the arcuate limbs 14 of the first bracket part 102 and the second bracket part 104 define a common limb, or link-structure, that functions to separate the first and second openings 16, 18.

The first and second protrusions 110, 112 also function to separate the first and second openings of the through-hole means. Said protrusions extend in substantially the same direction and can be seen to form the link-structure 20 that links parts of the structure. In other words, the arcuate limbs 14 define the through-hole means of the structure 12 in the bracket parts.

In use, the first bracket part 102 would be positioned on a pedal vehicle such that the pedal crank arm 6 was positioned within the first opening 16. Preferably, the pedal axle 8 would extend substantially perpendicularly from the first opening 16 through a third opening 22.

Once positioned thereon, the second protrusion 112 of the second bracket part 104 would be fed through the channel 118 on the first bracket part 102. As the second protrusion was being fed through the channel, the arcuate limb 14 of the second bracket part 104 would be manoeuvred such that the second opening 18 enclosed a part of the chain stay 2a, while the eye 114 was received through the slot 116 located on the first protrusion 110 of the first bracket part 102.

Thereafter, the first protrusion would be releasably secured to the closure side 106 of the second bracket part 104. Preferably, the first protrusion 110 would extend substantially through the frame 2 of the pedal vehicle and between the spokes of the adjacent wheel.

After the securing means is activated to lock the first and second bracket parts together, the device is in a closed configuration in which a frame part and a crank arm were held in the through-hole means against relative movement therebetween. Not only would the pedal vehicle be prevented from being pedalled, but an extension of the first protrusion 110 through the spokes of the wheel would also inhibit the pedal vehicle from being free-wheeled.

Alternatively, the engagement of the eye 114 and the slot 116 may involve the slot being replaced by two or more apertures in the first protrusion such that the closure side 106 of the second bracket part 104 may securably engage two or more predetermined positions. A single hole may be preferable if the security device is to be used on a particular pedal vehicle.

Figure 9B:
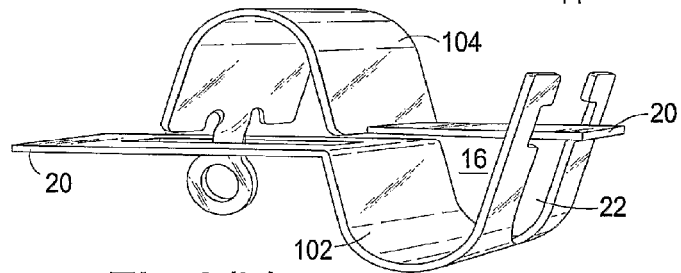

FIGS. 9(a) and 9(b), as viewed, show the first opening 16 orientated beneath the second opening 18. However, the device may be used in another configuration according to the application in which the device is to be used.

By way of example, the device shown in FIG. 9(a) may be positioned upon a pedal vehicle such that the pedal crank arm 6 and pedal axle 8 are located in the first opening 16 and the second protrusion 112 is positioned beneath the first opening. As a result, a user would have easier access to the eye 114 that is orientated upwards and may be able to secure a padlock thereon to secure the device in the closed configuration.

In light of the teaching of the present invention, a skilled person would clearly and unambiguously understand that the device may be orientated according to security and/or ergonomic requirements. The device may be configured such that access to the locking means is substantially restricted to a key and, therefore, access to the lock by tools that would be used by a thief, such as a hammer, is inhibited.

Figure 10:
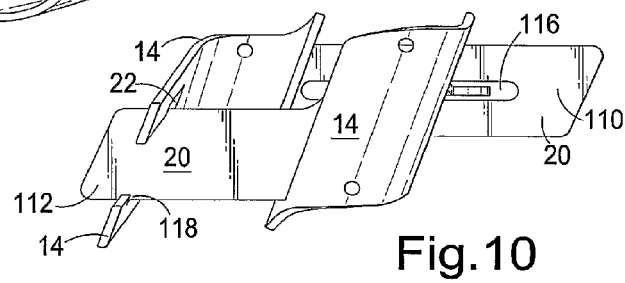
FIG. 10 is a plan view of a security device having the same technical features as the security device shown in FIG. 9 and configured in an asymmetrical manner.

In FIG. 10 a security device having like components and features to the device shown in FIG. 9 is provided with an asymmetrical configuration. As shown, the axes defined by the first and second openings 116, 118 are not perpendicular with the link-structure 20, such that the first and second bracket parts 102, 104 are asymmetrical and offset from said axes.

An asymmetrical configuration allows the device to be positioned on a pedal vehicle such that the protrusions, locking device and inter-connecting features 114, 116, 118 are accessible and access thereto is not restricted in use.

One or more components of the device may not be aligned and/or may not be perpendicular to a portion of the device that it is connected to because, in practice, a pedal vehicle may have curved and/or asymmetrical components to which the device is to be attached. Therefore, the device may have one or more curved and/or asymmetrical components and said components and axes of the openings may be offset to match those of a vehicle, or range of vehicles.

Figure 11:
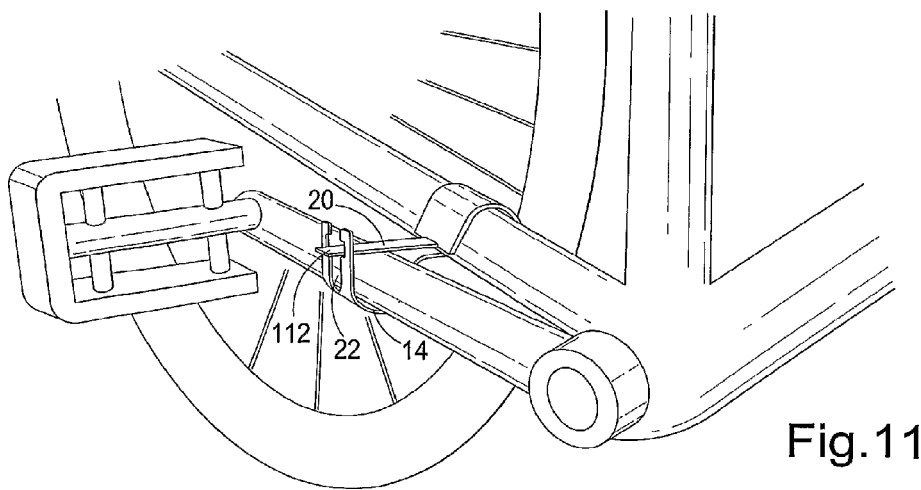
FIG. 11 shows a perspective view of the security device of FIG. 9 attached to a chain-stay and pedal crank arm of a pedal vehicle.

FIG. 11 shows the security device of FIG. 9 attached to a pedal vehicle. As viewed, the pedal axle 8 is not shown passing through the third opening 22. It would be clear to the skilled person that a repositioning of the security device on the pedal vehicle would allow the pedal axle 8 to be secured within the third opening of the security device and for a first protrusion 110 to extend rearward, as viewed, through the spokes of a wheel of the pedal vehicle.

Figure 12:
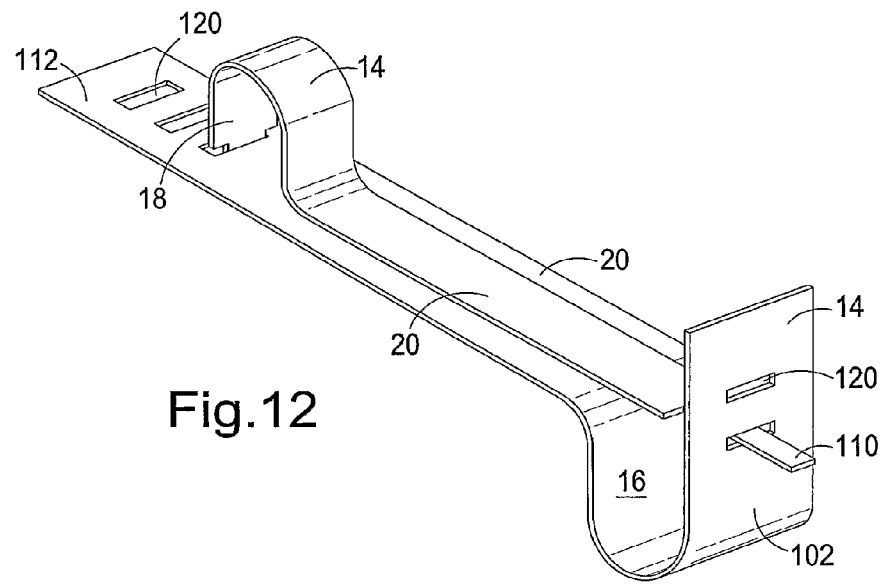
FIG. 12 shows a perspective view of another embodiment of the present invention.

FIG. 12 shows another embodiment of the present invention in which the first bracket part 102 engages with the second bracket part 104 via holes 120. The holes 120 enable the position of the first and second openings 16, 18 to be adjusted in discrete steps.

Figure 13A:
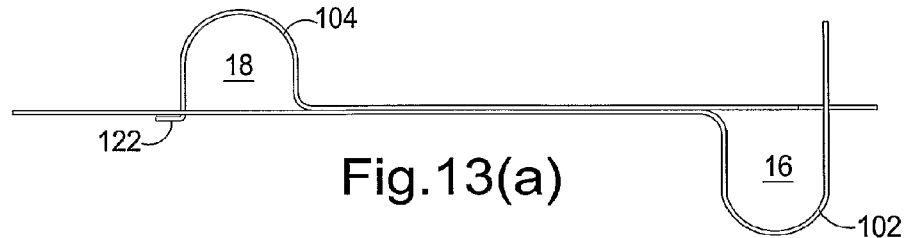
FIGS. 13(a) to 13(c) show an end elevation, top and bottom views of the embodiment shown in FIG. 12.
Figure 13B:
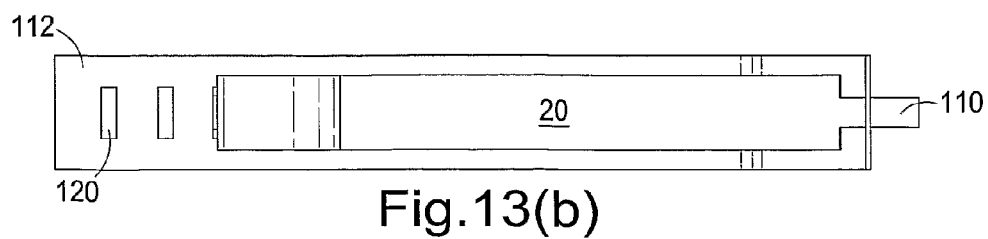
Figure 13C:
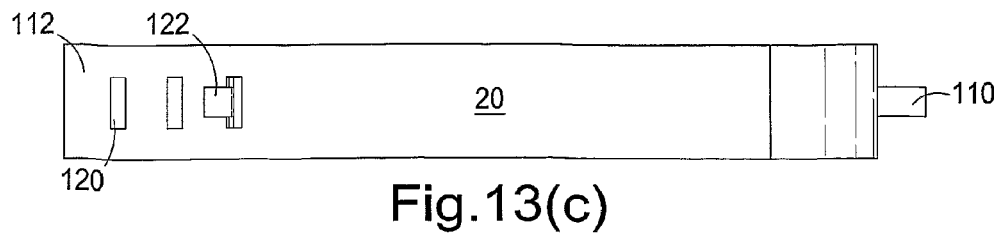

FIG. 13(a) shows an end elevation view of the security device shown in FIG. 12. In said view, a tongue 122 extending from the closure side 106 of the second bracket part 104 can be seen extending through a hole 120 on the first bracket part 102. FIGS. 13(b) and 13(c) show top and bottom views of the security device shown in FIG. 12.

In this particular embodiment, the tongue 122 and hole 120 function in a similar manner to the eye 114 and slot 116 described above in relation to FIG. 9(a).

The device may pass through the spokes or, alternatively, be configured such that one or more spokes pass between, or through, the link-structure 20. Therefore, the device may be configured with a gap between the first bracket part 102 and the second bracket part 104.

Further, the or each connecting part shown, by way of example in FIG. 12 (namely tongue 122 and portion of the first protrusion 110 that extends through the hole 120) may be adapted. For example, the tongue 122 may be extended, lengthened or adapted and/or one or more holes 120 may be provided in the tongue 122 such that the tongue may incorporate the securing means (not shown) and be locked to the second protrusion 112.

Similarly, the portion of the first protrusion 110 that extends through the hole 120, as shown, may be extended, lengthened or adapted to incorporate the securing means (not shown).

Figure 14:
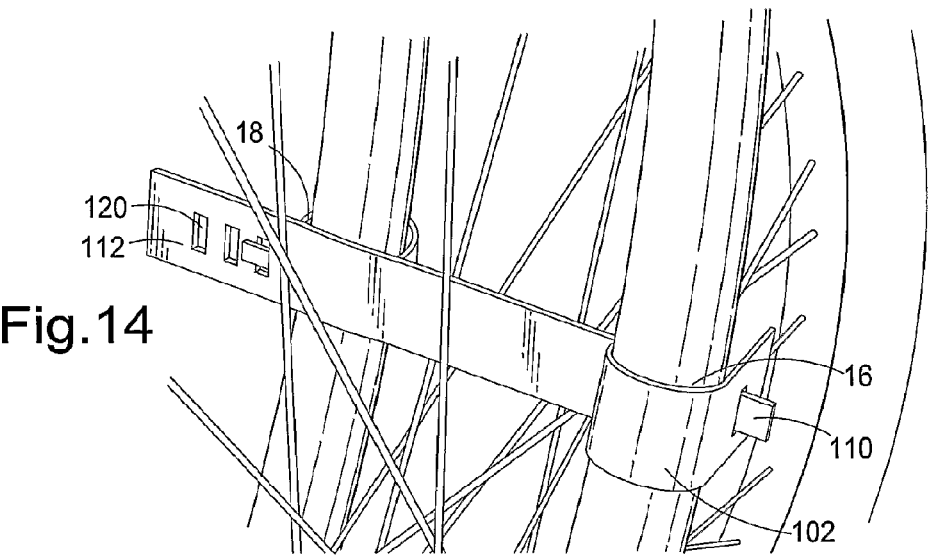
FIG. 14 shows a perspective view of the embodiment of FIG. 12 fitted to the forks of a bicycle frame and passing through the spokes of a wheel.

FIG. 14 shows the security device of FIG. 12, in use, wherein the forks of a pedal vehicle pass through the first and second openings 16, 18 and are secured thereon such that rotation of the adjacent wheel is inhibited.

Figure 15:
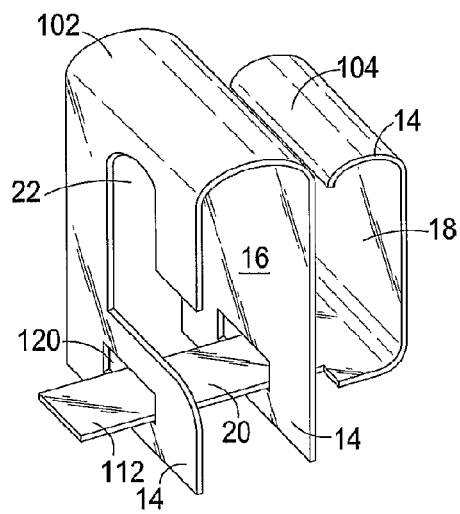
FIG. 15 shows a perspective view of another embodiment of a security device according to the present invention.

FIG. 15 shows a perspective view of another embodiment of the security device of the present invention. Like reference numerals refer to like components. In this particular embodiment, the first bracket part 102 is configured with two holes 120 that are aligned such that the second protrusion 112 of the second bracket part 104 may extend therethrough. The structure 12 is, therefore, connected by the link-structure 20, 112. The first protrusion is optional and may be configured to extend from the or each limb 14 from the first bracket part 102.

Figure 16A:
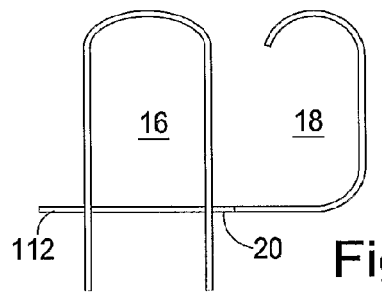
FIGS. 16(a) to 16(d) show end elevation, top and bottom views of the embodiment of FIG. 15.
Figure 16B:
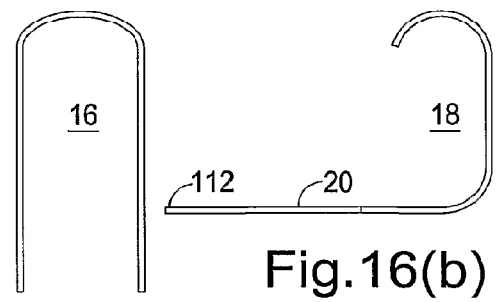
Figure 16C:
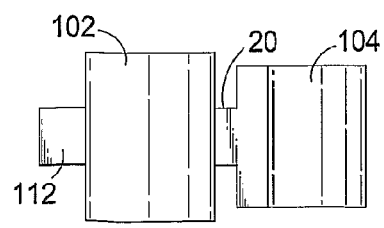
Figure 16D:
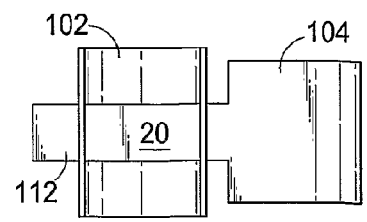

FIGS. 16(a) to 16(d) show alternative views of the security device of FIG. 15. In particular, FIGS. 16(a) and 16(b) show, respectively, the device of FIG. 15 in end elevation view in an open and closed configuration, respectively. FIGS. 16(c) and 16(d) show, respectively, top and bottom views of the device of FIG. 15 in a closed configuration.

Figure 17:
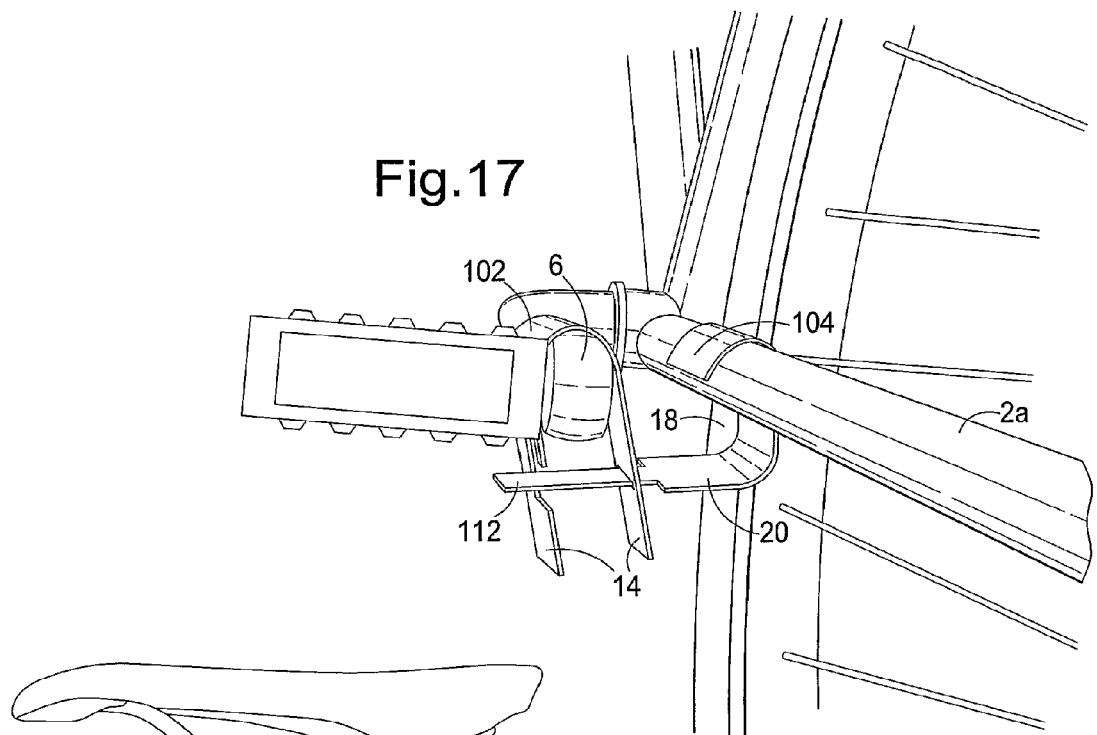
FIG. 17 shows a perspective view of the embodiment of FIG. 15 secured upon a pedal-axle, pedal crank arm and chain stay of a pedal vehicle.

FIG. 17 shows the device of FIG. 15 in a closed configuration upon a pedal vehicle. In use, the first bracket part 102 is located over a pedal crank arm 6 and the pedal axle 8. Thereafter, the second bracket part 104 is located over the chain stay 2a and the first protrusion 112 extends through the holes 120 before being releasably secured to said protrusion, which defines the link-structure 20 connecting the first and second openings 16, 18.

Figure 18:
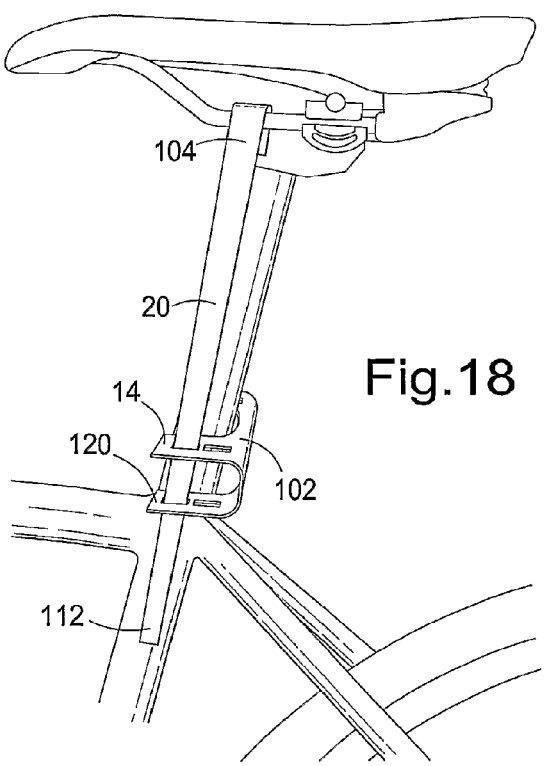
FIG. 18 shows a perspective view of another embodiment of the present invention securably attached to a portion of a saddle and a portion of the frame of a pedal vehicle.

FIG. 18 shows yet another embodiment of a security device according to the present invention. Like reference numerals refer to like components. In this embodiment, the second bracket part 104 encloses a portion of a saddle of the pedal vehicle within the second opening 18. The link-structure 20, in the form of a second protrusion 112, extends into holes 120 of the first bracket part 102. The first bracket part 102 is secured onto a portion of the frame of the pedal vehicle. In this application, the first bracket part comprises additional apertures and engaging features (not shown) that releasably locate the device onto the frame of the pedal vehicle. By way of example, the first bracket part connects to the seat-post quick-release pin.

Figure 19:
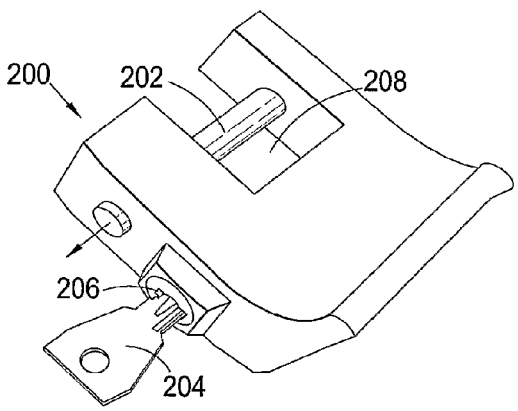
FIG. 19 shows a perspective view of a securing means component having a sliding bar operable by a key.

The securing means comprises a locking component 200 as shown in FIG. 19. The component has a bar, or bolt, 202 that is configured to be movable, in the direction of the arrow, as shown, by operation of a key 204 in a key-slot 206. The bolt 202 extends from the component on the same side upon which the key-slot 206 is positioned between an open and closed position. By being positioned on the same side, or adjacent one another, this enables the device to be mounted in confined spaces, such as the region where the chain-stays 2a join the bracket shell 4 of a vehicle frame.

The shape of the component 200 is configured to enable the securing means to be unobtrusively packaged onto the device resulting in a small device package. By way of example, the component 200 may be mounted on the closure side 106 of the second bracket part 104 and releasably secure the first protrusion 110 therein.

In use, a protrusion of the device would be securably held in a locking space 208 defined between the body and the bar 202 of the component.

The device has been described as having opening for, preferably, the chain-stay, forks and crank-arm. However, the device may be configured and/or adapted for use on any two, or more, portions of a pedal vehicle such that conventional use of the vehicle is inhibited. By way of example, the handlebars of the vehicle may be releasably secured to the cross-bar.

The device may even be used as an improved pad-lock type device, wherein a portion of the vehicle is located in the first opening and another permanent structure, or securing object, such as a railing, barrier, cycle stand and the like is located in the second opening. The securing means, as described above, would releasably secure the objects in the closed configuration.

Although the description and corresponding Figures describe generally square-shaped devices, the body, limbs and other components of the device may be configured to be generally round or curved. By way of example, the device, in a closed position, may have the form of a smooth pebble or egg. A device having a rounded form inhibits damage to the device by deflecting strikes or cutting edges during an attack.

Accessories may be attached or integrated to the device. For example, integrated lights or reflectors can be used to improve visibility. The device may have an attachment, such as a magnetic attachment, to allow the device to be attached or secured to the frame when not in use. The device may have an integrated safety lamp, with, for example, either a white or red lens, so that when not in use it can be used as a safety lamp when suitably secured to a vehicle. When not using the vehicle, the device/lamp can secure the vehicle as described above.

The device may be orientated according to security and/or ergonomic requirements and the aforementioned description and Figures are provided by way of example.

The present invention has been described above purely by way of example, and modifications can be made within the spirit of the invention, which extends to equivalents of the features described. The invention also consists in any individual features described or implicit herein or shown or implicit in the drawings or any combination of any such features or any generalisation of any such features or combination.

The invention claimed is:

1. A security device for securing to a pedal vehicle to prevent the vehicle being pedaled, the device having:
   receiving means comprising:
      a structure including a first bracket part and a second bracket part, the structure having a through-hole means for receiving a frame, a pedal crank arm and a pedal axle, the through-hole means including;
      a first opening having a first bracket part and configured for receiving a portion of the pedal crank arm therein;
      a second opening having a second bracket part and configured for receiving a portion of the frame of the vehicle therein; and
      a third opening substantially perpendicular to the first opening and the second opening and configured to receive the pedal axle when the pedal crank arm is received in the first opening;
   and
      a link-structure configured to link the parts of the structure having the through-hole means,
   wherein the receiving means has an open configuration in which the frame part, the pedal crank arm and the pedal axle can be placed in said through-hole means, and
   a closed configuration in which the frame part, the pedal crank arm and the pedal axle are held in the through-hole means against relative movement therebetween; and
   securing means for releasably securing the receiving means in the closed configuration;
   wherein the link-structure is defined by at least one of the first bracket part and the second bracket part and is arranged to separate the first opening from the second opening in the closed configuration.

2. A security device according to claim 1, wherein the first opening and the second opening are configured in opposition.

3. A security device according to claim 1, wherein the third opening is disposed adjacent the first opening.

4. A security device according to claim 1, wherein the receiving means has a body and the through-hole means having limbs extending from the body.

5. A security device according to claim 1, wherein the receiving means comprises a dividing part separating the first and second openings.

6. A security device according to claim 1, wherein the securing means is movably connected to the device and is configured to releasably secure the pedal crank arm in the first opening and the frame in the second opening.

7. A security device according to claim 1, wherein the device comprises a body and the first and second openings have limbs extending from the body.

8. A security device according to claim 7, wherein one of the limbs is a common limb arranged to divide the first opening and the second opening.

9. A security device according to claim 1, wherein the first opening, the second opening and the third opening are defined by at least four limbs extending from the body, the limbs including: a first limb and a second limb, arranged to define the first opening and the second opening; a common-limb, arranged between the first limb and the second limb to form a barrier between the first opening and the second opening; and an axle-limb, arranged to define the third opening and configured to receive the pedal axle such that the pedal axle, pedal crank arm and the frame of the vehicle can be releasably secured within the device.

10. A security device according to claim 1, wherein the securing means is movably connected to a limb.

11. A security device according to claim 8, wherein the securing means is movably connected to a limb that is positioned between the first opening and the second opening.

12. A security device according to claim 1, wherein the device has a body, and the securing means is rotatably connected to the device about an axis that is substantially perpendicular to a plane defined by the body.

13. A security device according to claim 12, wherein the securing means is a bar, and the bar is connected to the device by a pin, the pin being configured to extend, substantially perpendicularly to the bar and the body, from the bar and into an aperture in a limb, such that the bar is rotatable about an axis defined by the pin and movable with respect to the pin.

14. A security device according to claim 1, wherein the securing means comprises a closure or bar depending from the link-structure and being configured to be movable between the open configuration and the closed configuration of the device.

* * * * *